US012662944B1

(12) United States Patent
Weaver et al.

(10) Patent No.: US 12,662,944 B1
(45) Date of Patent: Jun. 23, 2026

(54) COMBUSTOR SCROLL DE-SWIRLER

(71) Applicant: PRATT & WHITNEY CANADA CORP., Longueuil (CA)

(72) Inventors: Paul Weaver, Chateauguay (CA); Guillaume Landry-Drolet, Boucherville (CA); Michel Desjardins, Saint-Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/217,490

(22) Filed: May 23, 2025

(51) Int. Cl.
*F01D 9/02* (2006.01)
*F01D 25/24* (2006.01)
*F04D 29/44* (2006.01)
*F23R 3/10* (2006.01)

(52) U.S. Cl.
CPC ............ *F01D 9/026* (2013.01); *F01D 25/24* (2013.01); *F04D 29/444* (2013.01); *F23R 3/10* (2013.01); *F05D 2240/12* (2013.01)

(58) Field of Classification Search
CPC ........................................................ F01D 9/026
See application file for complete search history.

(56) References Cited

U.S. PATENT DOCUMENTS 3,742,702 A 7/1973 Quinn
4,085,579 A 4/1978 Holzapfel et al.
4,339,925 A 7/1982 Eggmann et al.
4,429,527 A 2/1984 Teets
6,305,172 B1 10/2001 Kim
9,752,585 B2 9/2017 Kupratis
11,333,173 B2 5/2022 Nichols et al.
11,959,401 B1 4/2024 Nasir et al.
11,988,112 B2 5/2024 Pons et al.
12,286,926 B2 4/2025 Pons et al.
2014/0318151 A1 10/2014 Honnorat et al.
2023/0220800 A1* 7/2023 Pons ......................... F02C 7/08 60/791

FOREIGN PATENT DOCUMENTS

FR 3138830 A1 * 2/2024 ................ F02C 7/08

OTHER PUBLICATIONS

Editorial by Industrial Quick Search, Heat Exchangers, Oct. 31, 2023, retrieved from Wayback Machine Archive, https:// web.archive.org/web/20231031060140/https://www.iqsdirectory.com/articles/heat-exchanger.html (Year: 2023).

Wikipedia, Monotonic Function, Dec. 23, 2023, retrieved from Wayback Machine Archive, https://web.archive.org/web/20231223205637/https://en.wikipedia.org/wiki/Monotonic_function (Year: 2023).

* cited by examiner

*Primary Examiner* — Lorne E Meade
*Assistant Examiner* — Alyson Joan Harrington
(74) *Attorney, Agent, or Firm* — Kinney & Lange, P.A.

(57) ABSTRACT

An inlet scroll for a combustor includes an inlet, an annular outlet, a volute duct, and a transition. The volute extends from the inlet to circumscribe an axis to form a monotonically decreasing cross-sectional flow area from the inlet. The transition fluidly connects a radially inner boundary of the volute duct to the annular outlet. The transition includes a radial portion at the volute duct and an axial portion at the annular outlet.

19 Claims, 3 Drawing Sheets

COMBUSTOR SCROLL DE-SWIRLER

BACKGROUND

The present disclosure relates to gas turbine engines and more particularly, to ducting for introducing compressor air flow into a combustor plenum.

Combustor performance for gas turbine engines is affected by the uniformity of compressed gas entering the combustor plenum. Certain gas turbine engines have components and/or architectures that introduce swirl into the combustor plenum and/or include asymmetric supply of compressed gas into the combustor plenum. Past attempts to address uniformity within the combustor plenum include radial diffusers and axial diffusers. While these solutions are considered satisfactory for their intended purpose, further development of combustor plenum is needed to further improve combustor performance generally and, more particularly, for recuperative gas turbine engine architectures.

SUMMARY

An inlet scroll according to an example of this disclosure includes an inlet, an annular outlet, a volute duct, and a transition. The volute extends from the inlet to circumscribe an axis to form a monotonically decreasing cross-sectional flow area from the inlet. The transition fluidly connects a radially inner boundary of the volute duct to the annular outlet. The transition includes a radial portion at the volute duct and an axial portion at the annular outlet.

A gas turbine engine, according to another example of this disclosure, includes a compressor, a combustor shell, a casing, and an inlet scroll. The combustor shell bounds an annular combustion chamber. The casing circumscribes the combustor shell to define a plenum. The inlet scroll is in fluid communication with a discharge of the compressor. The inlet scroll includes an inlet, an annular outlet, a volute duct, and a transition. The volute duct extends from the inlet to circumscribe an axis to form a monotonically decreasing cross-sectional flow area from the inlet. The transition fluidly connects a radially inner boundary of the volute duct to the annular outlet, which fluidly communicates with the plenum. The transition includes a radial portion at the volute duct and an axial portion at the annular outlet.

DETAILED DESCRIPTION

Figure 1:
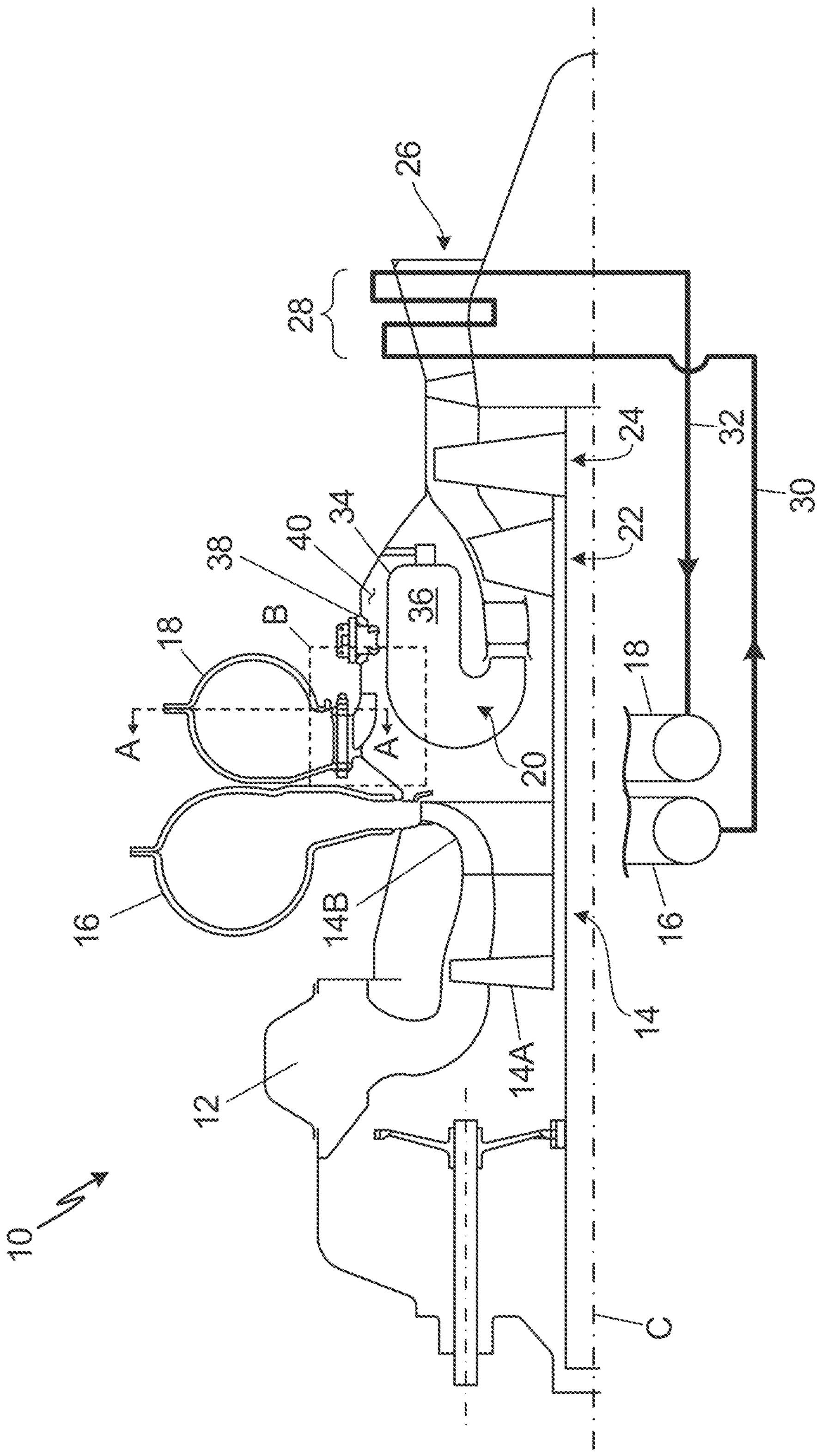
FIG. 1 is a schematic cross-sectional view of an example gas turbine engine with an inlet scroll to a combustor.

FIG. 1 is a schematic cross-sectional view of gas turbine engine 10, which is depicted with a turboshaft architecture that includes a gas generator and a power turbine. In other examples, gas turbine engine 10 can be configured with a single spool architecture, a dual spool architecture, or more than two spools (e.g., a topping cycle spool non-concentrically arranged with respect to one or more primary spools). Gas turbine engine 10 can be configured as a propulsion engine, for example, a turbofan engine and/or a turboprop engine rather than the depicted turboshaft configuration. In other examples, gas turbine engine 10 can be an industrial gas turbine engine driving a load (e.g., an electric machine). The architecture of gas turbine engine 10 depicts a forward-to-aft main gas flow path in which the engine ingests air into a forward portion of the engine that flows aft through the compressor section, the combustor, and the turbine section before discharging from an aft portion of the engine. In other examples, gas turbine engine 10 can have a reverse-flow architecture in which the engine ingests air into an aft portion of the engine that flows forward through the compressor section, the combustor, and the turbine section before discharging through an exhaust at a forward portion of the engine. Each compressor and/or turbine section can have one or more stages. Each stage can include at least one rotor of circumferentially spaced blades and at least one stator of circumferentially spaced and stationary vanes. As depicted, gas turbine engine 10 includes multiple compressor stages and multiple turbine stages. However, other examples of gas turbine engine 10 can have more stages or less stages than the number of compressor stages and/or turbine stages depicted by FIG. 1.

As depicted in FIG. 1, gas turbine engine 10 includes, in serial flow communication, air inlet 12, compressor section 14, compressor discharge duct 16, inlet scroll 18, combustor 20, turbine section 22, power turbine 24, and exhaust section 26. Compressor section 14 pressurizes air entering gas turbine engine 10 through air inlet 12 using axial compressor stage 14A and radial compressor stage 14B. The pressurized air discharged from compressor section 14 enters compressor discharge duct 16 and inlet scroll 18 before mixing with fuel inside combustor 20. Igniters initiate combustion of the air-fuel mixture within combustor 20, which is sustained by a continuous supply of fuel and pressurized air and/or igniter activation. A heated and compressed air stream discharges through turbine section 22, power turbine 24, and exhaust section 26. Turbine section 22 extracts energy from the exhaust stream to drive compressor section 14 and other engine accessories such as electrical generators and pumps for lubrication, fuel, and/or actuators.

In certain examples, gas turbine engine 10 can be configured with a recuperative gas turbine engine architecture that includes heat exchanger 28 in a heat exchange relationship with the exhaust stream in turbine section 22 and/or downstream from turbine section 22. Heat exchanger 28 receives compressed air from compressor discharge duct 16 via supply line 30, and preheats the compressed air stream using heat received from the exhaust stream. A heated and compressed air stream discharges from heat exchanger 28 to inlet scroll 18 via return line 32. By preheating the compressed air stream, the compressed air stream enters combustor 20 at a higher temperature relative to a gas turbine engine 10 without heat exchanger 28. Accordingly, gas turbine engine 10 with a recuperative gas turbine engine architecture can achieve a target power level using less fuel, increasing the efficiency of gas turbine engine 10.

Since the compressed air stream discharged from compressor section 14 is diverted from an axial flow direction to heat exchanger 28 via compressor discharge duct 16, the heated compressed air stream is reintroduced into combustor 20 by inlet scroll 18. Combustor 20 includes combustor shell 34, which bounds an annular combustion chamber 36. Casing 38 surrounds combustor shell 34 to form plenum 40. As received by inlet scroll 18, the compressed air stream has a majority circumferential flow direction and discharges into plenum 40 of combustor 20 along a majority axial flow direction. Inlet scroll 18 reduces variance of velocity and pressure distributions of the compressed air stream discharged into plenum 40 and thereby improves uniformity and stability of combustion within combustor 20.

Figure 2:
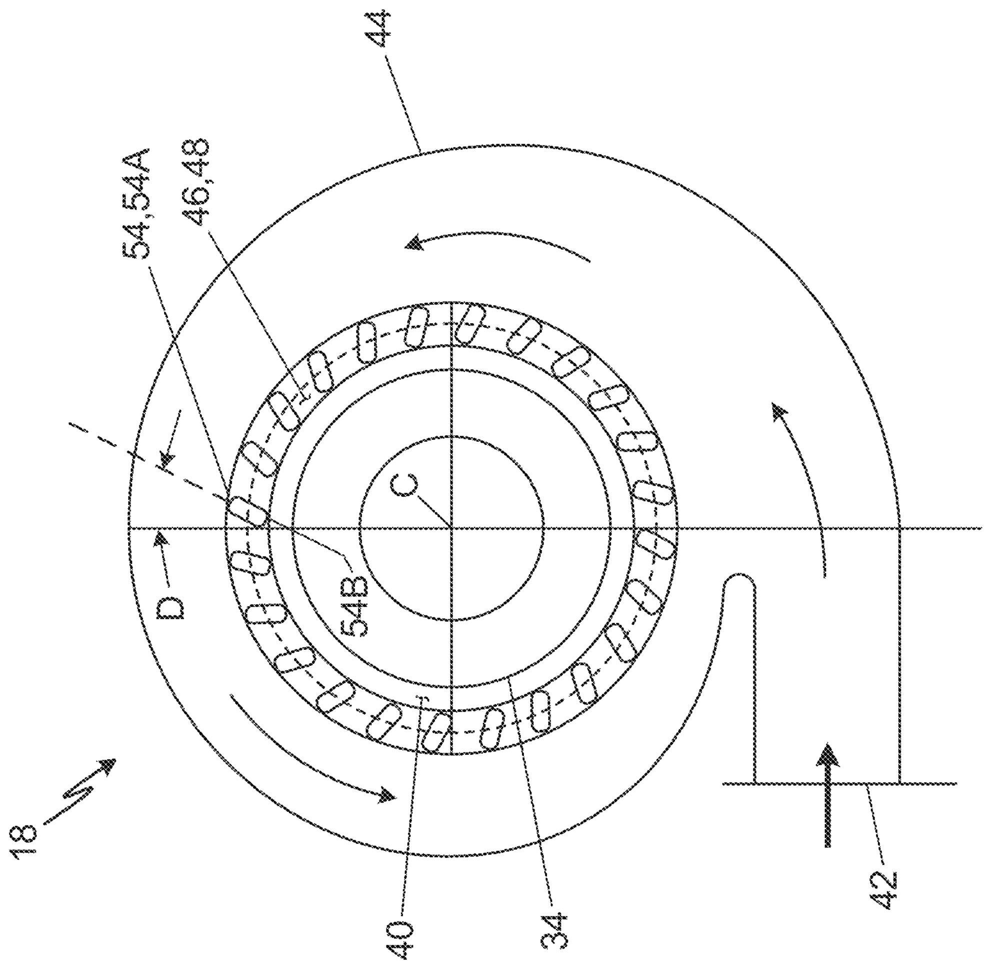
FIG. 2 is a cross-sectional view of an example inlet scroll taken along line A-A.
Figure 3:
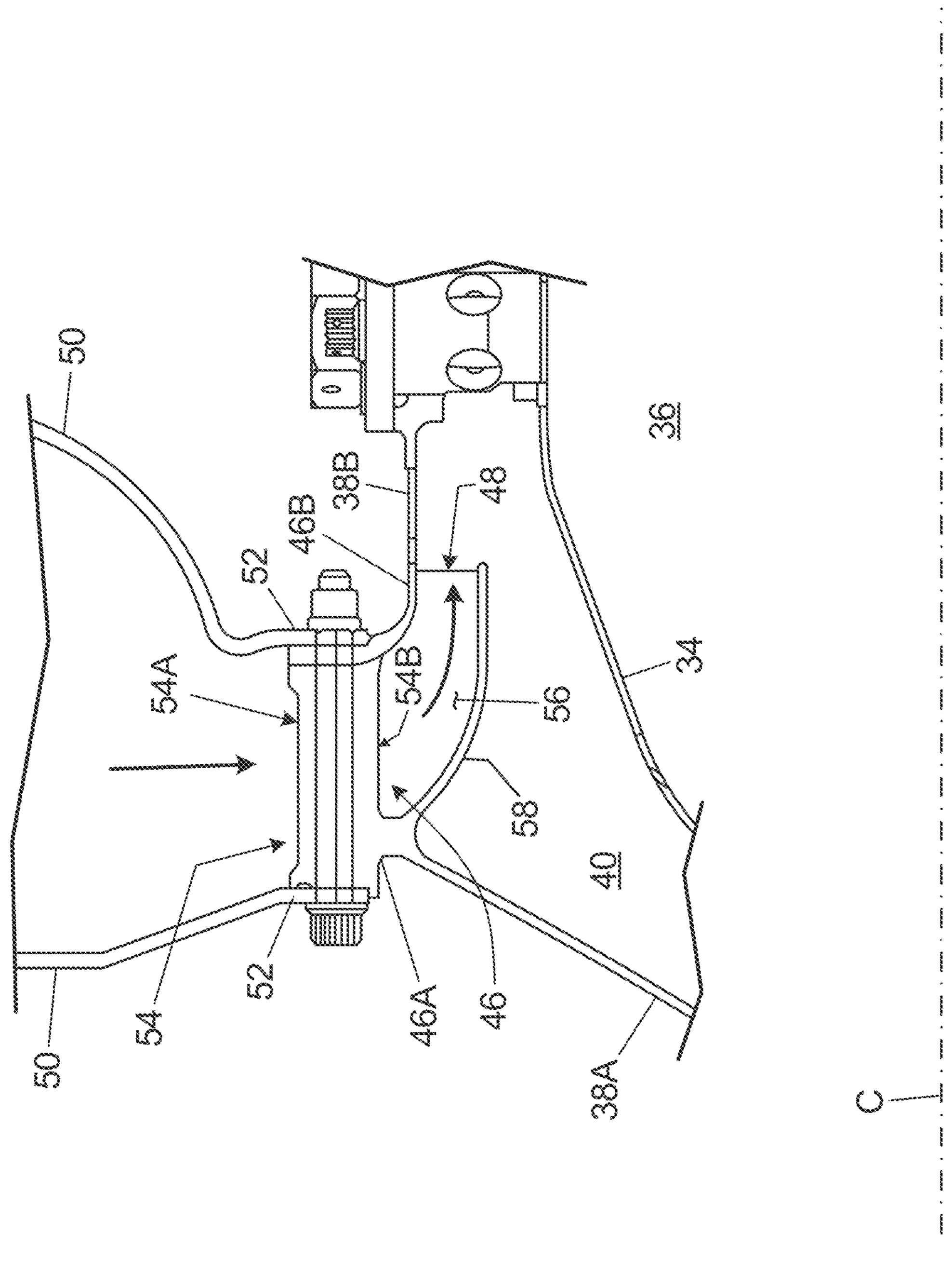
FIG. 3 is a cross-sectional view of the gas turbine and inlet scroll depicted region B of FIG. 1.

FIG. 2 is a cross-sectional view taken along line A-A depicting a schematic example of inlet scroll 18. FIG. 3 is a cross-sectional view enlarging region B of FIG. 1. FIG. 2 and FIG. 3 are discussed together below.

Inlet scroll 18 includes inlet 42, volute duct 44, transition 46, and outlet 48. In operation, compressed air enters inlet scroll 18 through inlet 42. Volute duct 44 extends from inlet 42 to guide the compressed air circumferentially about axis C. Transition 46 fluidly connects to a radially inner boundary of volute duct 44 to guide compressed air from the volute duct 44 to annular outlet 48. Compressed air enters transition 46 along a radial direction or a radial-circumferential direction relative to axis C and discharges transition along an axial direction or an axial-circumferential direction relative to axis C.

Volute duct 44 defines a monotonically decreasing cross-sectional area from inlet 42 along a circumferential direction about axis C to promote a uniform circumferential distribution of compressed air entering transition 46. In some examples, volute duct 44 includes a radially decreasing outer boundary and a constant radius inner boundary and constant axial width. In other examples, a decreasing axial width alone or in combination with a radially decreasing outer boundary may contribute to a decreasing cross-sectional area.

Volute duct 44 can be formed by one or more sheet metal sections that are fastened or joined together by a mechanical connection. As depicted by FIG. 1, volute duct 44 can include first and second sections 50 split along a plane normal to axis C (e.g., a plane extending along section line A-A). Each of first and second sections form half of volute duct 44. First and second sections 50 are joined at a radially outer boundary at respective flanges 52, which are formed by radially outward extending portions of first and second sections. The radially inner boundaries of first and second sections 50 form interior flanges that mate with transition 46 of inlet scroll 18. The radial inner boundary of volute duct 44 is open to receive transition 46 and permit compressed air to exit volute duct 44 therethrough.

Transition 46 includes radial portion 46A and axial portion 46B. Radial portion 46A forms a radially outer portion of transition 46 that is received by the radially inner boundary of volute duct 44 at, for example, interior flanges 52 and extends substantially in a radial direction relative to axis C. Axial portion 46B extends from radial portion 46A in a substantially axial direction relative to axis C. Together, radial portion 46A and axial portion 46B form a continuous transition to guide compressed air exiting volute duct 44 from a radial direction or radial-circumferential direction to an axial direction or an axial-circumferential direction. Annular outlet 48 of compressor inlet scroll 18 is formed by a downstream end of transition 46 and characterized by an outlet area defined by a cross-sectional area of annular outlet 48 taken in a plane normal to axis C. Axial portion 46B of transition 46 can be positioned radially outward within plenum 40 such that a gap is formed between axial portion 46B and combustor shell 34, which is measured as the minimum linear distance between axial portion 46B and combustor shell 34. A plenum area taken as the cross-sectional area between axial portion 46B of transition 46 and combustor shell 34 along this gap can be equal to or greater than the cross-sectional area of annular outlet 48 in some examples.

In certain examples, transition 46 further includes vanes 54 distributed about axis C that are configured to counteract swirl (i.e., a circumferential flow) imposed by volute duct 44. Each vane 54 extends radially inward from leading edge 54A to trailing edge 54B to define a chord line. Vanes 54 can be radially oriented such that respective chord lines extend radially only. In other examples, chord lines of vanes 54 can form respective acute angles with respect to radial datums, each radial datum passing through a leading edge of one of vanes 54. For example, vanes 54 can form acute angles D with radial datums such that trailing edges 54B are displaced circumferential downstream in a direction of circumferential flow within volute duct 44 relative to leading edges 54A as depicted in FIG. 2. Vanes 54 can define an axial load path through inlet scroll 18 and, therefore, transition 46 can be joined to and interposed between first casing section 38A and second casing section 38B at vanes 54.

In some examples, vanes 54 each include axial extension 56 that is attached to or integral with respective vanes 54. Vanes 54 with axial extension 56 extend radially within radial portion 46A of transition and extend axially within axial portion 46B from leading edge 54A to outlet 48, or any location intermediate between trailing edge 54B and outlet 48. Axial extensions 56 further reduce swirl and further change the direction from radial to axial of compressed air flow exiting through annular outlet 48 of inlet scroll 18.

In some examples, transition 46 can include one or more apertures 58 extending through transition 46 at a location between volute duct 44 and annular outlet 48. Each of apertures 58 places transition 46 in fluid communication with plenum 40 of combustor 20 discrete from annular outlet 48. In some examples, a single aperture 58 can be used while other examples can include two or more apertures 58, or an array of apertures 58 spaced circumferentially about axis C. Each aperture 58 can be oriented to discharge a portion of the compressed air flow into plenum 40 and can improve pressure distribution and/or velocity distribution uniformity of the compressed air within plenum 40. In certain examples, one or more apertures 58 can be oriented to direct a portion of the compressed air flow at an optimal location on or towards combustor shell 34.

DISCUSSION OF POSSIBLE EMBODIMENTS

The following are non-exclusive descriptions of possible embodiments of the present invention.

An Inlet Scroll for a Gas Turbine Engine Combustor

An inlet scroll according to an example embodiment of this disclosure includes, among other possible things, an inlet, an annular outlet, a volute duct, and a transition. The volute duct extends from the inlet to circumscribe an axis and includes a monotonically decreasing cross-sectional area normal to a circumferential direction about the axis. The transition fluidly connects a radially inner boundary of the volute duct to the annular outlet. The transition includes a radial portion at the volute duct and an axial portion at the annular outlet.

The inlet scroll of the preceding paragraph can optionally include, additionally and/or alternatively, any one or more of the following features, configurations and/or additional components.

A further embodiment of the foregoing of inlet scroll, wherein the transition can further include an aperture extending through the inlet scroll at an intermediate location between the volute duct and the annular outlet.

A further embodiment of any of the foregoing inlet scrolls, wherein an outlet area of the annular outlet can be equal to or greater than an inlet area of the inlet.

A further embodiment of any of the foregoing inlet scrolls, wherein the transition can further comprise a plurality of vanes disposed about the axis.

A further embodiment of any of the foregoing inlet scrolls, wherein the plurality of vane can be disposed within at least the radial portion of the transition.

A further embodiment of any of the foregoing inlet scrolls, wherein each vane of the plurality of vanes can extend from a radially outer leading edge to a radially inner trailing edge to define an acute angle relative to a radial direction of the axis.

A further embodiment of any of the foregoing inlet scrolls, wherein the plurality of vanes can extend from the radial portion into at least a portion of the axial portion of the transition.

A further embodiment of any of the foregoing inlet scrolls, wherein the plurality of vanes can form an axial load path through the inlet scroll.

A further embodiment of any of the foregoing inlet scrolls, wherein the transition can further include an aperture extending through the inlet scroll between two adjacent vanes of the plurality of vanes and at an intermediate location between the volute duct and the annular outlet.

A further embodiment of any of the foregoing inlet scrolls, wherein an outlet area of the annular outlet can be equal to or greater than an inlet area of the inlet.

A further embodiment of any of the foregoing inlet scrolls, wherein the outlet area can be defined normal to the axis and the inlet area can be defined normal to the circumferential direction.

A gas turbine engine with an inlet scroll to the combustor

A gas turbine engine according to an example embodiment of this disclosure includes, among other possible things, a compressor, a combustor shell, a casing, and an inlet scroll. The combustor shell bounds an annular combustion chamber. The casing circumscribes the combustor shell to define a plenum. The inlet scroll is in fluid communication with a discharge of the compressor. The inlet scroll includes an inlet, an annular outlet, a volute duct, and a transition. The volute duct extends from the inlet to circumscribe an axis and includes a monotonically decreasing cross-sectional area normal to a circumferential direction about the axis. The transition fluidly connects a radially inner boundary of the volute duct to the annular outlet. The transition includes a radial portion at the volute duct and an axial portion at the annular outlet.

The gas turbine engine of the preceding paragraph can optionally include, additionally and/or alternatively, any one or more of the following features, configurations and/or additional components.

A further embodiment of the gas turbine engine, wherein the annular outlet of the inlet scroll can be radially adjacent to an interior surface of the casing such that fluid discharged through the annular outlet flows along the interior surface of the casing.

A further embodiment of any of the gas turbine engines, wherein the transition can further include an aperture extending through the inlet scroll at an intermediate location between the volute duct and the annular outlet.

A further embodiment of any of the gas turbine engines, wherein the aperture fluidly connects the transition to the plenum.

A further embodiment of any of the gas turbine engines, wherein the aperture can be oriented to direct fluid towards an exterior of the combustor shell.

A further embodiment of any of the gas turbine engines, wherein the transition can be spaced from the combustion shell at the annular outlet to define a gap between the axial portion of the transition and the combustor shell.

A further embodiment of any of the gas turbine engines, wherein the transition can be spaced from the combustion shell at the annular outlet to define an annular plenum area.

A further embodiment of any of the gas turbine engines, wherein the annular plenum area can be equal to or greater than an outlet area of the annular outlet.

A further embodiment of any of the gas turbine engines, wherein the transition can further comprise a plurality of vanes disposed about the axis.

A further embodiment of any of the foregoing gas turbine engines, wherein the plurality of vanes can be disposed within at least the radial portion of the transition.

A further embodiment of any of the foregoing gas turbine engines, wherein each vane of the plurality of vanes can extend from a radially outer leading edge to a radially inner trailing edge to define an acute angle relative to a radial direction of the axis.

A further embodiment of any of the foregoing gas turbine engines, wherein the plurality of vanes can extend from the radial portion into at least a portion of the axial portion of the transition.

A further embodiment of any of the foregoing gas turbine engines, wherein the plurality of vanes can form an axial load path through the inlet scroll.

A further embodiment of any of the foregoing gas turbine engines, wherein the transition can further include an aperture extending through the inlet scroll between two adjacent vanes of the plurality of vanes and at an intermediate location between the volute duct and the annular outlet.

A further embodiment of any of the foregoing gas turbine engines, wherein an outlet area of the annular outlet can be equal to or greater than an inlet area of the inlet.

A further embodiment of any of the foregoing gas turbine engines, wherein the outlet area can be defined normal to the axis and the inlet area can be defined normal to the circumferential direction.

A further embodiment of any of the gas turbine engines can further include a heat exchanger in thermal communication with an exhaust stream of the gas turbine engine.

A further embodiment of any of the gas turbine engines, wherein the heat exchanger can receive compressed gas from the compressor discharge duct and can discharge compressed gas heated by the exhaust stream to the inlet scroll.

A further embodiment of any of the gas turbine engines, a compressor discharge duct in fluid communication with the discharge of the compressor and the heat exchanger to deliver compressed gas from the compressor to the heat exchanger.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An inlet scroll for a combustor comprising:

an inlet;

an annular outlet;

a volute duct extending from the inlet to circumscribe an axis, the volute duct comprising a monotonically decreasing cross-sectional area normal to a circumferential direction about the axis; and a transition fluidly connecting a radially inner boundary of the volute duct to the annular outlet, wherein the transition includes:

a radial portion at the volute duct;

an axial portion at the annular outlet; and a plurality of vanes disposed about the axis within at least the radial portion of the transition, wherein the plurality of vanes forms an axial load path through the inlet scroll;

wherein the volute duct is split along a plane normal to the axis into a first section and a second section; and wherein the first section and the second section are joined at respective radially outer flanges and joined to the transition at respective radially inner flanges, the respective radially inner flanges are joined to the transition via at least one fastener extending axially through the respective radially inner flanges and at least one of the plurality of vanes.

2. The inlet scroll of claim 1, wherein the transition further includes an aperture extending through the transition at an intermediate location between the volute duct and the annular outlet that fluidly connects the transition to a region exterior to the inlet scroll.

3. The inlet scroll of claim 1, wherein an outlet area of the annular outlet is equal to or greater than an inlet area of the inlet, and wherein the outlet area is defined normal to the axis and the inlet area is defined normal to the circumferential direction.

4. The inlet scroll of claim 1 wherein each vane of the plurality of vanes extends from a radially outer leading edge to a radially inner trailing edge to define an acute angle relative to a radial datum intersecting the axis.

5. The inlet scroll of claim 4, wherein the plurality of vanes extends from the radial portion into at least a portion of the axial portion of the transition.

6. The inlet scroll of claim 4, wherein the inlet scroll further includes an aperture extending through the transition between two adjacent vanes of the plurality of vanes and at an intermediate location between the volute duct and the annular outlet that fluidly connects the transition to a region exterior to the inlet scroll.

7. The inlet scroll of claim 4, wherein an outlet area of the annular outlet is equal to or greater than an inlet area of the inlet, and wherein the outlet area is defined normal to the axis and the inlet area is defined normal to the circumferential direction.

8. A gas turbine engine comprising:

a compressor;

a combustor shell bounding an annular combustion chamber of a combustor;

a casing circumscribing the combustor shell to define a plenum; and an inlet scroll for the combustor in fluid communication with a discharge of the compressor, the inlet scroll comprises:

an inlet;

an annular outlet in fluid communication with the plenum;

a volute duct extending from the inlet to circumscribe an axis, the volute duct comprising a monotonically decreasing cross-sectional area normal to a circumferential direction about the axis; and a transition fluidly connecting a radially inner boundary of the volute duct to the annular outlet, wherein the transition includes:

a radial portion at the volute duct;

an axial portion at the annular outlet; and a plurality of vanes disposed about the axis within at least the radial portion of the transition, wherein the plurality of vanes forms an axial load path through the inlet scroll;

wherein the volute duct is split along a plane normal to the axis into a first section and a second section; and wherein the first section and the second section are joined at respective radially outer flanges and joined to the transition at respective radially inner flanges, the respective radially inner flanges are joined to the transition via at least one fastener extending axially through the respective radially inner flanges and at least one of the plurality of vanes.

9. The gas turbine engine of claim 8, wherein the annular outlet of the inlet scroll is radially adjacent to an interior surface of the casing such that fluid discharged through the annular outlet flows along the interior surface of the casing.

10. The gas turbine engine of claim 8, wherein the inlet scroll transition further includes an aperture extending through the transition at an intermediate location between the volute duct and the annular outlet, and wherein the aperture fluidly connects the transition to the plenum.

11. The gas turbine engine of claim 10, wherein the aperture is oriented to direct compressed gas from within the transition towards an exterior of the combustor shell.

12. The gas turbine engine of claim 8, wherein the transition is spaced from the combustion shell at the annular outlet to define a gap between the axial portion of the transition and the combustor shell.

13. The gas turbine engine of claim 8, wherein each vane of the plurality of vanes extends from a radially outer leading edge to a radially inner trailing edge to define an acute angle relative to a radial datum intersecting the axis.

14. The gas turbine engine of claim 13, wherein the plurality of vanes extends from the radial portion into at least a portion of the axial portion of the transition.

15. The gas turbine engine of claim 13, wherein the axial load path is from the first section to the second section through the plurality of vanes.

16. The gas turbine engine of claim 13, wherein the inlet scroll further includes an aperture extending through the transition between two adjacent vanes of the plurality of vanes and at an intermediate location between the volute duct and the annular outlet, and wherein the aperture fluidly connects the transition to the plenum.

17. The gas turbine engine of claim 8, further comprising:

a heat exchanger in thermal communication with an exhaust stream of the gas turbine engine, wherein the heat exchanger receives compressed gas from a compressor discharge duct and discharges compressed gas heated by the exhaust stream to the inlet scroll.

18. The gas turbine engine of claim 17, further comprising:

the compressor discharge duct in fluid communication with the discharge of the compressor and the heat exchanger to deliver compressed gas from the compressor to the heat exchanger.

19. A gas turbine engine comprising:

a compressor;

a compressor discharge duct in fluid communication with a discharge of the compressor;

a heat exchanger in thermal communication with an exhaust stream of the gas turbine engine, wherein the heat exchanger receives compressed gas from the compressor discharge duct via a supply line fluidly connecting the compressor discharge duct with the heat exchanger;

a combustor shell bounding an annular combustion chamber of a combustor;

a casing circumscribing the combustor shell to define a plenum; and an inlet scroll for the combustor in fluid communication with the heat exchanger to receive the compressed gas discharged from the heat exchanger, the inlet scroll comprising:

an inlet;

an annular outlet in fluid communication with the plenum;

a volute duct extending from the inlet to circumscribe an axis, the volute duct comprising:

a monotonically decreasing cross-sectional area normal to a circumferential direction about the axis;

a transition fluidly connecting a radially inner boundary of the volute duct to the annular outlet, wherein the transition includes a radial portion at the volute duct and an axial portion at the annular outlet; and a plurality of vanes disposed about the axis within at least the radial portion of the transition, each vane of the plurality of vanes extending from a radially outer leading edge to a radially inner trailing edge to define an acute angle relative to a radial datum intersecting the axis, wherein the plurality of vanes forms an axial load path through the inlet scroll, and wherein the volute duct is split along a plane normal to the axis into a first section and a second section, and wherein the first section and the second section are joined at respective radially outer flanges and joined to the transition at respective radially inner flanges, the respective radially inner flanges are joined to the transition via at least one fastener extending axially through the respective radially inner flanges and at least one of the plurality of vanes.

* * * * *